(12) United States Patent
Delgado et al.

(10) Patent No.: US 9,308,535 B2
(45) Date of Patent: Apr. 12, 2016

(54) COMPOSTING DEVICE

(71) Applicant: Whirlpool Corporation, Benton Harbor, MI (US)

(72) Inventors: Kristopher L. Delgado, Stevensville, MI (US); Jeffrey J. Jacobs, Hammond, IN (US); Christopher Camp, Morton, IL (US); Janglih Lin, Normal, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 176 days.

(21) Appl. No.: 13/952,883

(22) Filed: Jul. 29, 2013

(65) Prior Publication Data

US 2015/0031123 A1   Jan. 29, 2015

(51) Int. Cl.
*C05F 17/02* (2006.01)
*B02C 23/02* (2006.01)
*B02C 18/00* (2006.01)
*B02C 18/18* (2006.01)
*B02C 18/22* (2006.01)
*B02C 18/24* (2006.01)

(52) U.S. Cl.
CPC ............ *B02C 23/02* (2013.01); *B02C 18/0084* (2013.01); *B02C 18/18* (2013.01); *B02C 18/2216* (2013.01); *B02C 18/2258* (2013.01); *B02C 18/24* (2013.01); *C05F 17/0205* (2013.01); *Y02P 20/145* (2015.11)

(58) Field of Classification Search
CPC ........ C05F 9/02; C05F 17/02; C05F 17/0205; C05F 17/0294; B02C 18/0084; B65F 1/1426–1/1442; B65F 2001/1489; C12M 21/16; C12M 27/06; C12M 33/16; C12M 45/02
See application file for complete search history.

(56) References Cited

U.S. PATENT DOCUMENTS

| | | | |
|---|---|---|---|
| 6,653,123 B2 | 11/2003 | Horigane | |
| 6,727,090 B1 | 4/2004 | Hronek | |
| 6,958,110 B2 | 10/2005 | Sermanni et al. | |
| 7,785,866 B2 | 8/2010 | Winslow | |
| 8,266,822 B2 | 9/2012 | Fraza | |
| 2004/0201338 A1* | 10/2004 | Mouw | 312/319.9 |
| 2005/0284202 A1 | 12/2005 | Rampton et al. | |
| 2006/0261143 A1* | 11/2006 | Sola Barbarin et al. | 232/43.1 |
| 2010/0133370 A1* | 6/2010 | Flynn | 241/46.01 |
| 2012/0196357 A1 | 8/2012 | Smith-Sebasto | |

FOREIGN PATENT DOCUMENTS

| | | | |
|---|---|---|---|
| FR | 2921854 A1 | 4/2009 | |
| GB | 2484409 A | 4/2012 | |
| WO | WO 2012095706 A1 * | 7/2012 | |

* cited by examiner

*Primary Examiner* — William H Beisner (57) ABSTRACT

A device for transforming refuse into compost according to a cycle of operation has a cabinet, a hopper, a first reducing mechanism in the hopper, a first heating element coupled to the hopper, a transfer mechanism disposed in a conduit from the hopper to an outlet, a motor beneath the hopper and the transfer mechanism, a container removably mounted in the cabinet and beneath the outlet, a second reducing mechanism in the container, and a second heating element coupled to the container.

20 Claims, 9 Drawing Sheets

COMPOSTING DEVICE

BACKGROUND

Composting devices are known to implement a composting cycle for biologically and chemically decomposing refuse, such as organic food waste, into compost for use as a fertilizer and soil amendment. The composting cycle may be implemented in a composting bin by providing water, heat and aeration to the refuse, and may require a period of time for completion. Composting devices usually require a large floor space and/or a large volume for installation. Further, some composting devices may be a batch type device, therefore may not be effective in producing compost in a continuous way.

BRIEF SUMMARY

The invention relates to a device for transforming refuse into compost. The device includes a cabinet and a hopper at an upper portion of the cabinet. The hopper has an opening though the cabinet that is configured to receive refuse. A first reducing mechanism is disposed in the hopper to operably reduce the refuse to smaller components and a transfer mechanism is disposed in a conduit extending upwardly from the hopper to an outlet in the upper portion of the cabinet. A first heating element is operably coupled to the hopper. A motor beneath the hopper and the transfer mechanism is operably connected to the first reducing mechanism and to the transfer mechanism to operate the first reducing mechanism and the transfer mechanism. First and second heating elements are operably coupled to the hopper and a container, respectively. The container having a second reducing mechanism in the container is removably mounted within the cabinet adjacent the motor and beneath the outlet to receive processed refuse from the outlet. A second heating element is operably coupled to the container. The container is accessible from outside the cabinet.

DETAILED DESCRIPTION

Figure 1:
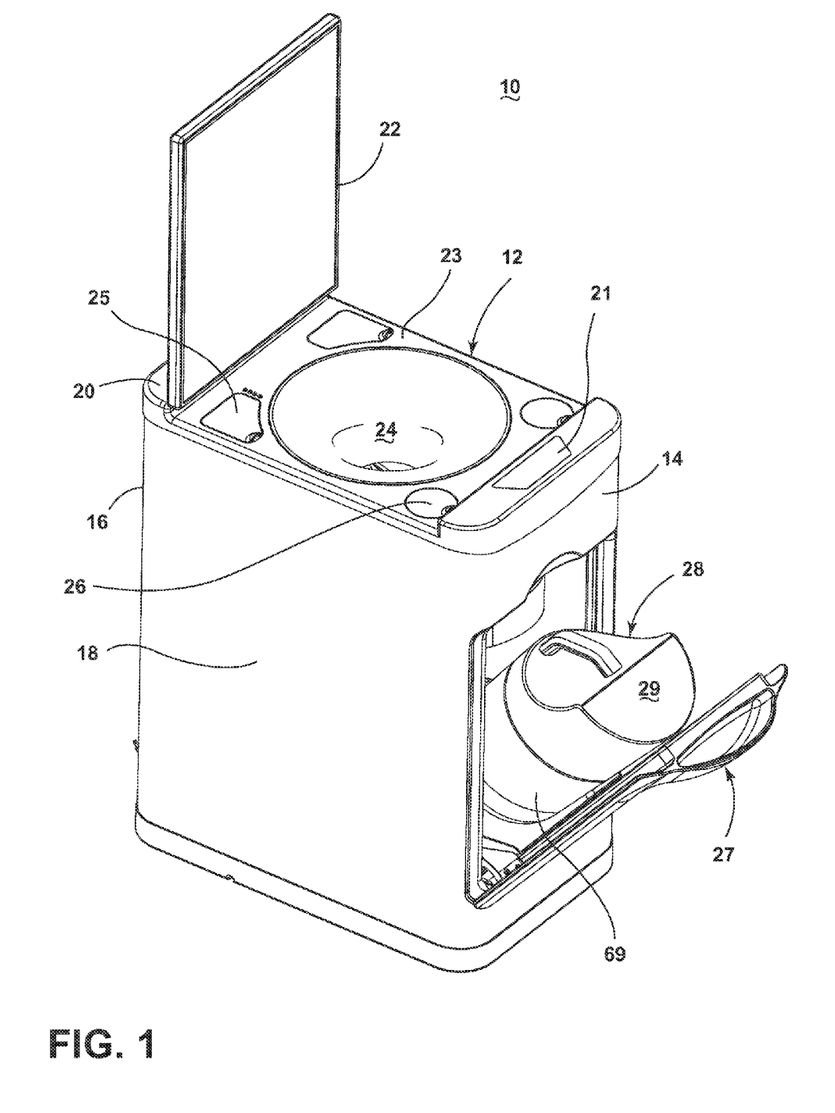
FIG. 1 is a perspective view of a device in the form of a composting device for transforming refuse into compost according to a first embodiment of the invention.

The drawings show one embodiment of the invention; it will be understood that other forms and configurations of devices can also encompass the invention. FIG. 1, for example, illustrates a perspective view of a device 10 in the form of a composter for transforming refuse into compost according to a first embodiment of the invention. The composting device 10 may include a cabinet 12 having a front wall 14 spaced from a back wall 16, and a pair of side walls 18 extending between the front and back walls 14, 16.

A top wall 20 may enclose the cabinet 12 at the top of the front wall 14, back wall 16, and the pair of side walls 18. The top wall 20 may include a cover 22 pivotally mounted to a portion of the top wall 20 for movement between open or closed positions, and to enable access to other components of the cabinet 12. In other embodiments, the cover 20 is slidably mounted or removably mounted to a top portion of the top wall 20. The top wall 20, as well as the remainder of the cabinet 12, may be formed of a rigid and durable material such as steel, a metal alloy, or a hardened polymer composite material.

A controller (not shown) may be located within the device 10, and may be operably coupled with a user interface 21 for receiving user-selected inputs and communicating information to the user. The user interface 21 may be provided on a portion of the top wall 20 for communicating with the user. The user interface 21 may include operational controls such as dials, lights, switches, and displays enabling the user to input commands to the controller and receive information about a cycle of operation.

A portion 23 of the top wall 20 is configured to receive the cover 22 and defines an opening 24 positioned beneath the cover 22 in the closed position. The opening 24 exposes the interior of the cabinet 12. The portion 23 may also include one or more water fill inlets 25 for supplying water to the composting device 10, and one or more enzyme dispenser inlets 26.

The front wall 14 may include an access door 27, which may be movably connected to a side of the cabinet 12 as at the front wall 14 for access to the interior. As illustrated, the access door 27 is pivotally connected to the front wall 14 on a horizontal axis for movement between open and closed positions. It will be understood, however, that the access door 27 may be movably connected to the cabinet 12 in other ways. For example, the access door 27 may be pivotally connected to the front wall 14 on a vertical axis. In another example, the access door 24 may be slidably movable between the open position and the closed position. As well as it may be movably connected to a side wall 18.

A container 28 may be mounted to an internal side of the access door 27 where it is accessible from outside the cabinet 12 when the access door is in an open position. For example, the container 28 may be detachably mounted to the access door 27 by a bayonet mounting where twisting it in a clockwise or counter clockwise direction by ¼ or ½ turn will detach or attach the container relative to the access door 24. It will be understood that the container 28 may not need to be mounted to the access door 27 in another embodiment. For example, the container 28 may be positioned in the interior 32 of the cabinet, without explicitly being mounted to the access door 27. The container 28 may include at least one opening 29 for purposes described hereinafter. The container 28 need not be mounted to the access door 27; rather it is important that the container be accessible from outside the cabinet and that it be removable so that the contents thereof can be discharged at will by a user, as for example, by dumping the contents of the container through the opening 29 onto a garden.

Figure 2:
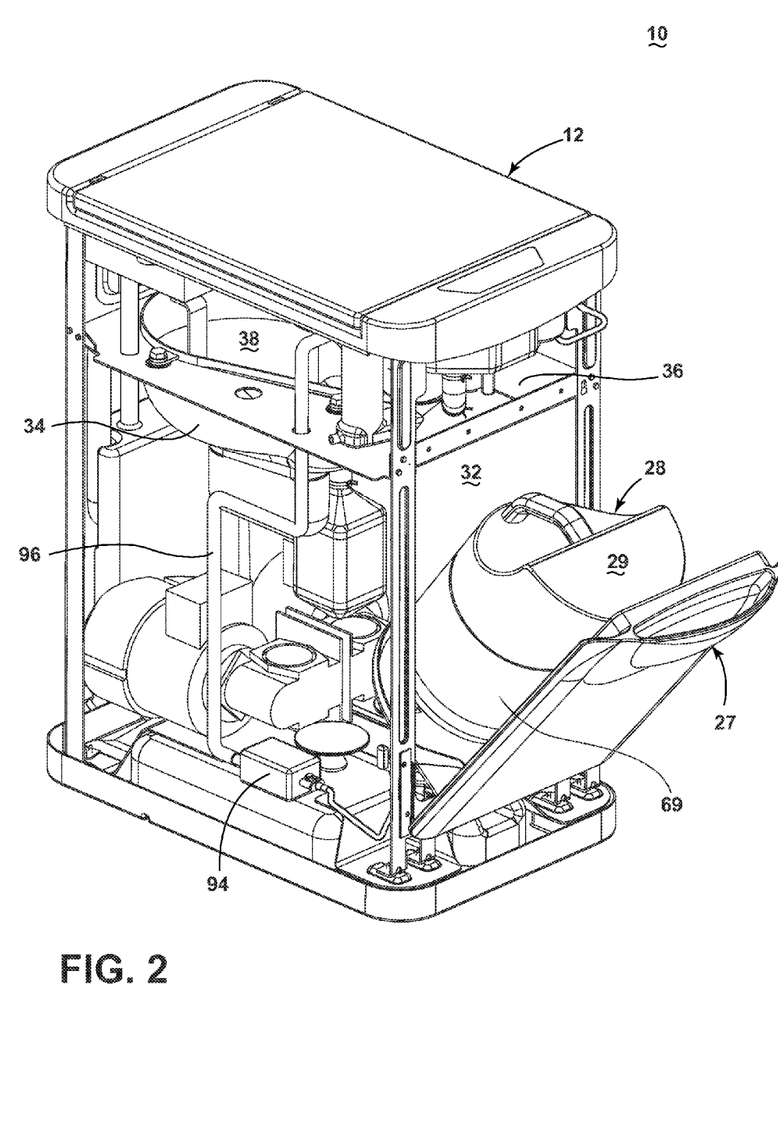
FIG. 2 is a perspective view of the composing device of FIG. 1, where side walls are removed for illustrating the components of the composting device.

Referring now to FIGS. 2-6, an arrangement of various components in the cabinet interior 32 is illustrated. The cabinet 12 may include a hopper 30 positioned at an upper portion of the cabinet 12, and the hopper 30 may include a top portion 33 and a bottom portion 34. The hopper 30 may be fixedly mounted to the cabinet 12. For example, as illustrated in FIG. 2, the bottom portion 34 of the hopper 30 may be nested within an opening formed in a horizontally extending supporting plate 36, which, in turn, is fixedly coupled to the cabinet 12 by means of a plurality of fasteners such as screws, bolts or nuts. The hopper 30, as a whole, may define a chamber 38 where the top portion 33 has an opening adjacent to the opening 24 in the top wall 20 configured to receive refuse from outside of the composting device 10. The chamber 38 may be concave shaped, such as a bowl.

A conduit 40 may also extend upwardly from one side of the hopper 30 at a predetermined angle α with respect to a horizontal plane 42, preferably from a lower portion of the hopper 30 toward the front of the cabinet and the access door 27, and may include an outlet 44 at an upper portion of the cabinet away from the hopper. A transfer mechanism 50 such as a rotatable auger may be disposed in the conduit 40 for rotating in a clockwise or counter clockwise direction with respect to its rotational axis 52. The rotatable auger 50 may be configured such that a lower end portion of the rotatable auger 50 may be positioned at the lower portion of the hopper 30, while the upper end portion of the rotatable auger 50 may extend through the outlet 44 of the conduit 40 at the upper portion of the cabinet. The hopper 30 may also include a transfer downspout 54. The transfer downspout 54 may be configured to downwardly extend from the outlet 44 of the conduit 40. Other transfer mechanisms 50 may include a conveyor or a gravitational chute or the like.

Figure 5:
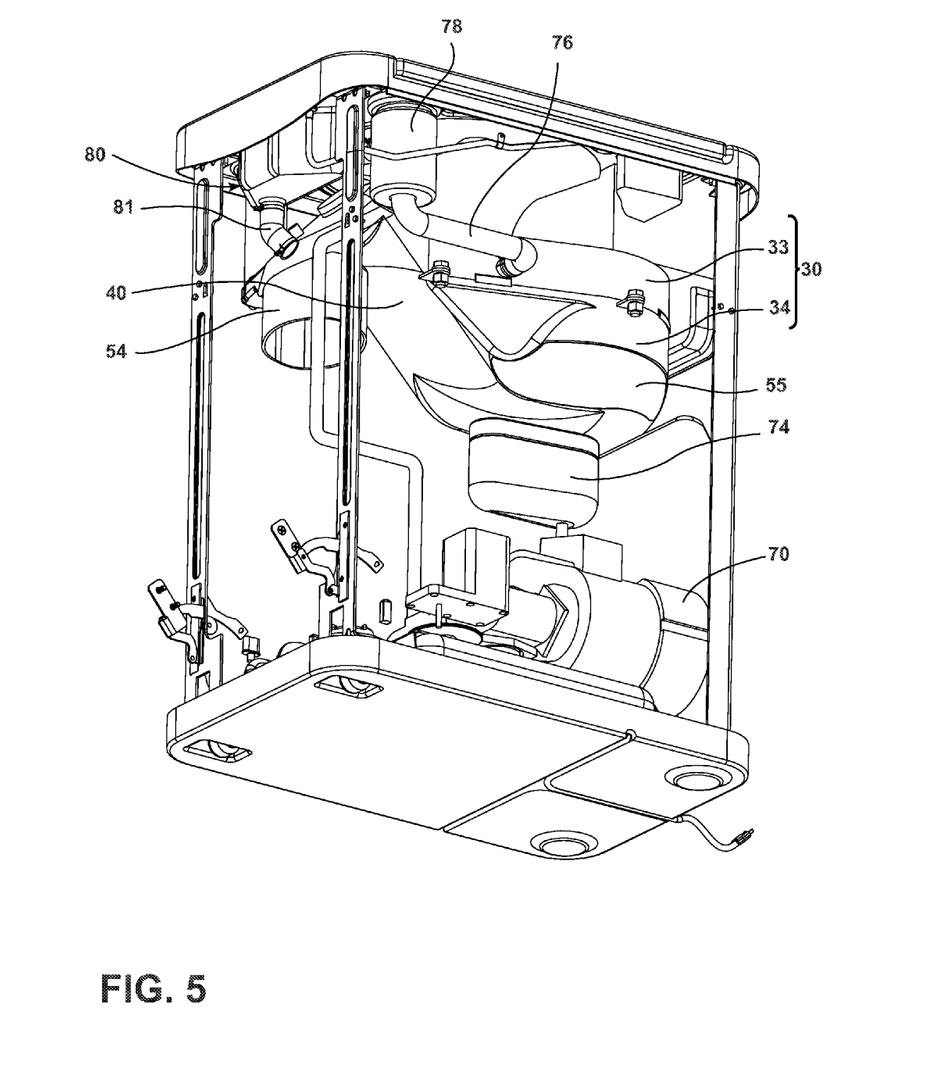
FIG. 5 is a perspective view of the composting device of FIG. 2, viewed from the bottom of the composting device, with front and side walls and the supporting plate removed.

A first heating element 55 may be coupled to the exterior of the hopper 30 for controllably providing heat energy to the refuse received in the interior of the hopper 30. As illustrated in FIG. 5, the first heating element 55 may be a stick-on heater mounted to the exterior of the hopper 30. For example, the first heating element 55 may be in the form of a blanket heater and mounted to a portion of exterior surface of the hopper 30. In another example, a sheath heater may be mounted to the exterior of the hopper 30. It may be understood that the first heating element 55 may be mounted at any portion of the hopper 30. In one example, the first heating element 55 may be mounted at the lower portion, such as a bottom area, of the hopper 30.

An enzyme dispenser 56 may be disposed in the cabinet and accessible via an enzyme dispenser inlet 26. Preferably the enzyme dispenser 56 will be positioned to dispense enzyme into the container 28 when the access door 27 is in a closed position with the container inside the cabinet for maintaining the functionality of proteins in the composting process. The enzyme dispenser 56 may include a conduit (not shown), which may be fluidly coupled to the downwardly extending transfer downspout 54.

While the enzyme dispenser 56 may dispense enzymes, other bio-components may also be dispensed by the enzyme dispenser 56. One example of enzyme for the enzyme dispenser 56 is Biomix®, which can be in the form of a compressed solid puck and may include one or more enzymes, bacteria, fungi, or any combination thereof. The enzyme dispenser 56 may be configured to hold a plurality of Biomix® pucks. In another embodiment, Biomix® may be provided and dispensed in the form of a powder.

Figure 3:
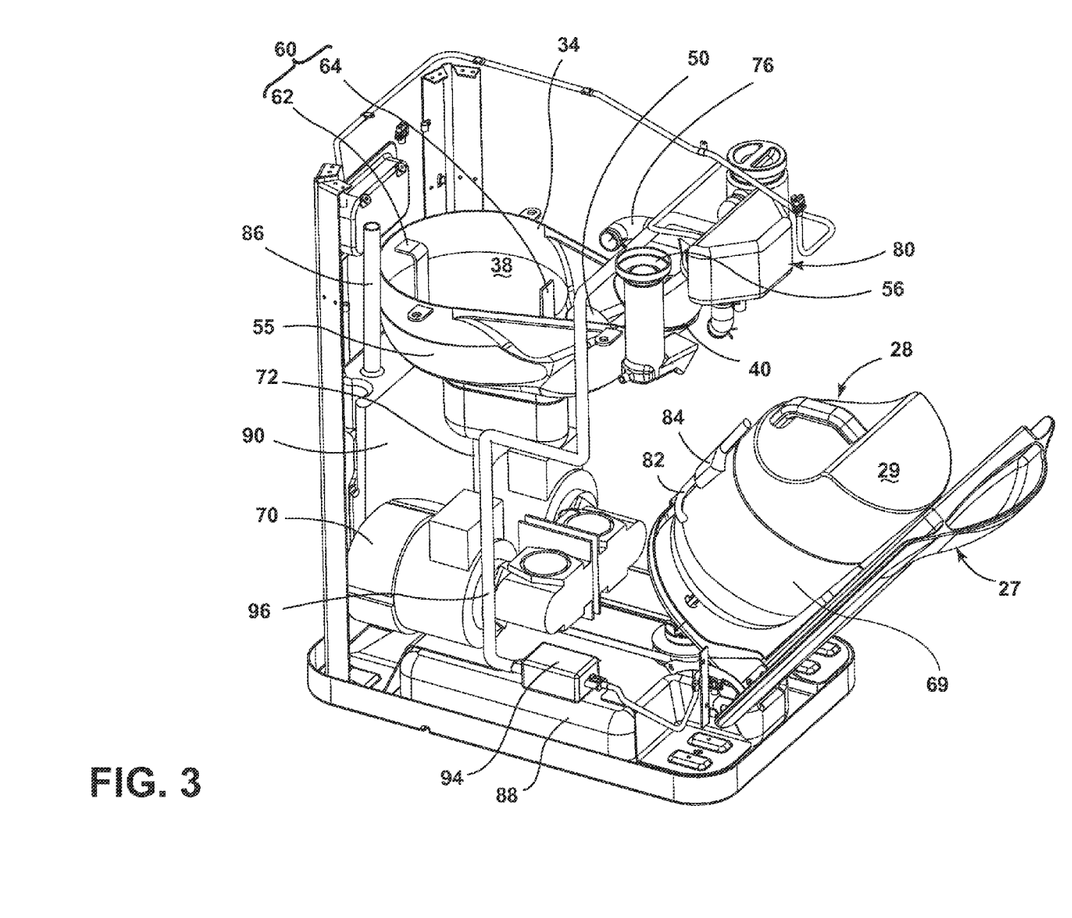
FIG. 3 is a perspective view of the composting device of FIG. 2, viewed from the left side of the composting device, with a top wall and a supporting plate removed.
Figure 4:
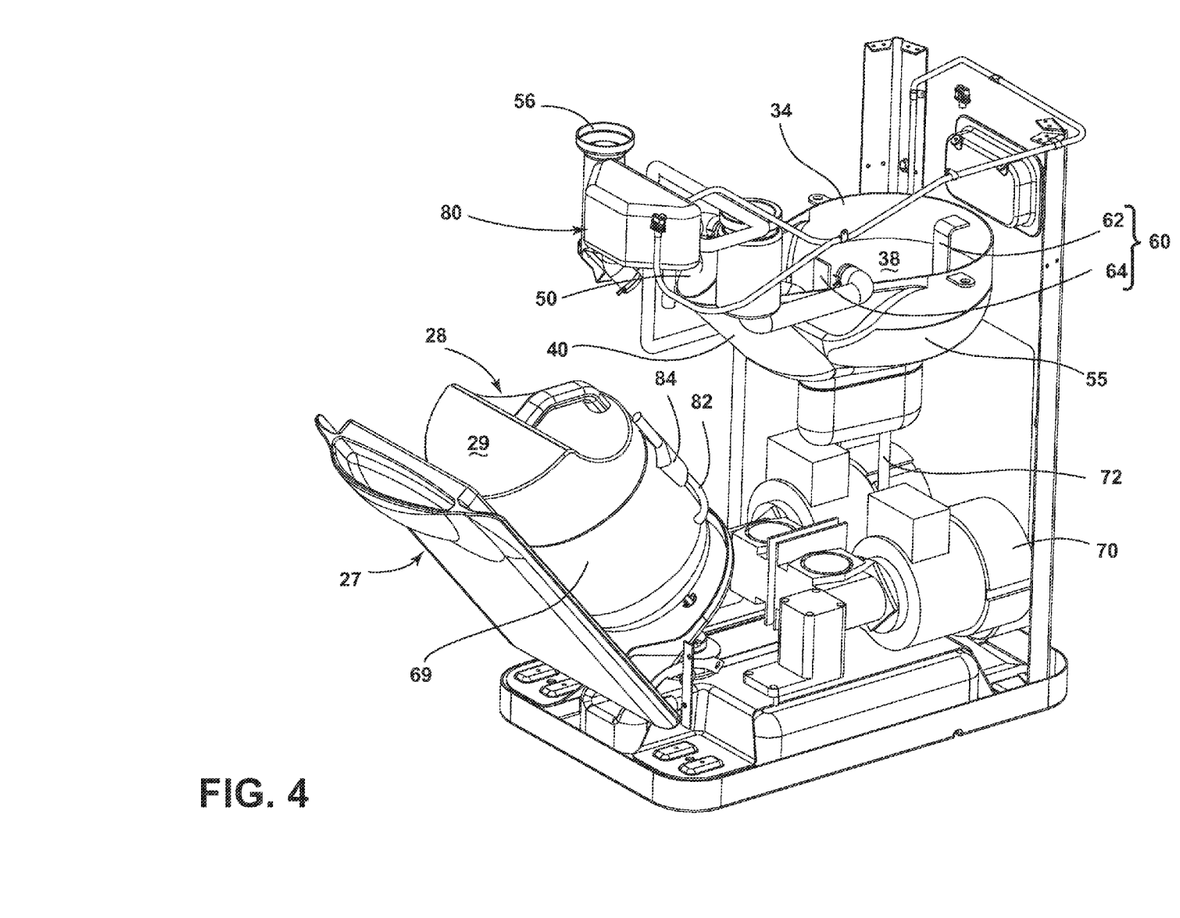
FIG. 4 is a perspective view of the composting device of FIG. 2, viewed from the right side of the composting device, with a top wall and a supporting plate removed.

A first reducing mechanism 60 may be provided in the hopper 30. As illustrated in FIGS. 3 and 4, the first reducing mechanism 60 may be disposed at a lower portion of the hopper 30. The first reducing mechanism 60 may be in the form of a grinding wheel, a grinding blade, any chopping mechanism, or any like device or combination thereof that grinds, shears chops, mixes, breaks, or otherwise reduces the particle sizes of refuse by the operation of the first reducing mechanism 60 and/or uniformly mixing refuse with water, air or enzymes that may be introduced in the hopper 30 for transforming the refuse into compost.

The first reducing mechanism 60 may include first and second blades 62, 64 having different dimensions and shapes, respectively, while other configurations may be also possible for the first reducing mechanism 60. As illustrated, the first blade 62 may be horizontally extended and then angled in a vertical direction. The end portion of the first blade 62 may be bent again at a right angle. The second blade 64 may be in a curved shape for uniformly mixing the refuse received in the interior of the hopper 30, in combination of the first blade 62.

The container 28 may also include a second reducing mechanism 66 positioned at a lower portion of the container 28. The second reducing mechanism 66 in the container 28 may include at least one blade 68 for further reducing the dimension of materials and uniform mixing of materials in the container 28.

A second heating element 69 may also be provided to the container 28. As illustrated in FIG. 4, the second heating element 69 may be in the form of a blanket heater mounted to at least a portion of the exterior of the container 28 for providing heat energy into the interior of the container 28 by heat conduction. In another example, a sheath heater may be mounted to the exterior of the container 28. It may be understood that the second heating element 69 may be positioned in the interior of the container 28 and may be in direct contact with refuse in the container 28. In yet another example, the second heating element 69 may be provided to the container 28 in the form of an in-line heater having resistive heaters. At least one in-line heater may be operably mounted to the container 28 such that hot air may be supplied into the interior of the container 28 via heat convection.

A motor 70 may be provided in a lower portion of the cabinet 12 beneath the hopper 30 and the auger 50, and may be operably coupled to the first reducing mechanism 60 via a rotatable shaft 72. The second reducing mechanism 66 in the container 28 may be operably detachably coupled to the motor 70 by means of a pulley and a belt while other coupling mechanisms may be also possible for coupling the motor 70 and the second reducing mechanism 66. For example, combination of multiple mating gears such as small/large gears, rack and pinion etc, may operably couple the motor 70 and the second reducing mechanism 66.

The motor 70 may be a brushless permanent magnet (BPM) motor. Alternately, other motors such as an induction motor or a permanent split capacitor (PSC) motor may also be used. The motor 70 may be configured to operate the first reducing mechanism 60 at different speeds during the cycle of operation to facilitate the reducing and/or mixing of refuse in the interior of the hopper 30 and/or the container 28.

Figure 6:
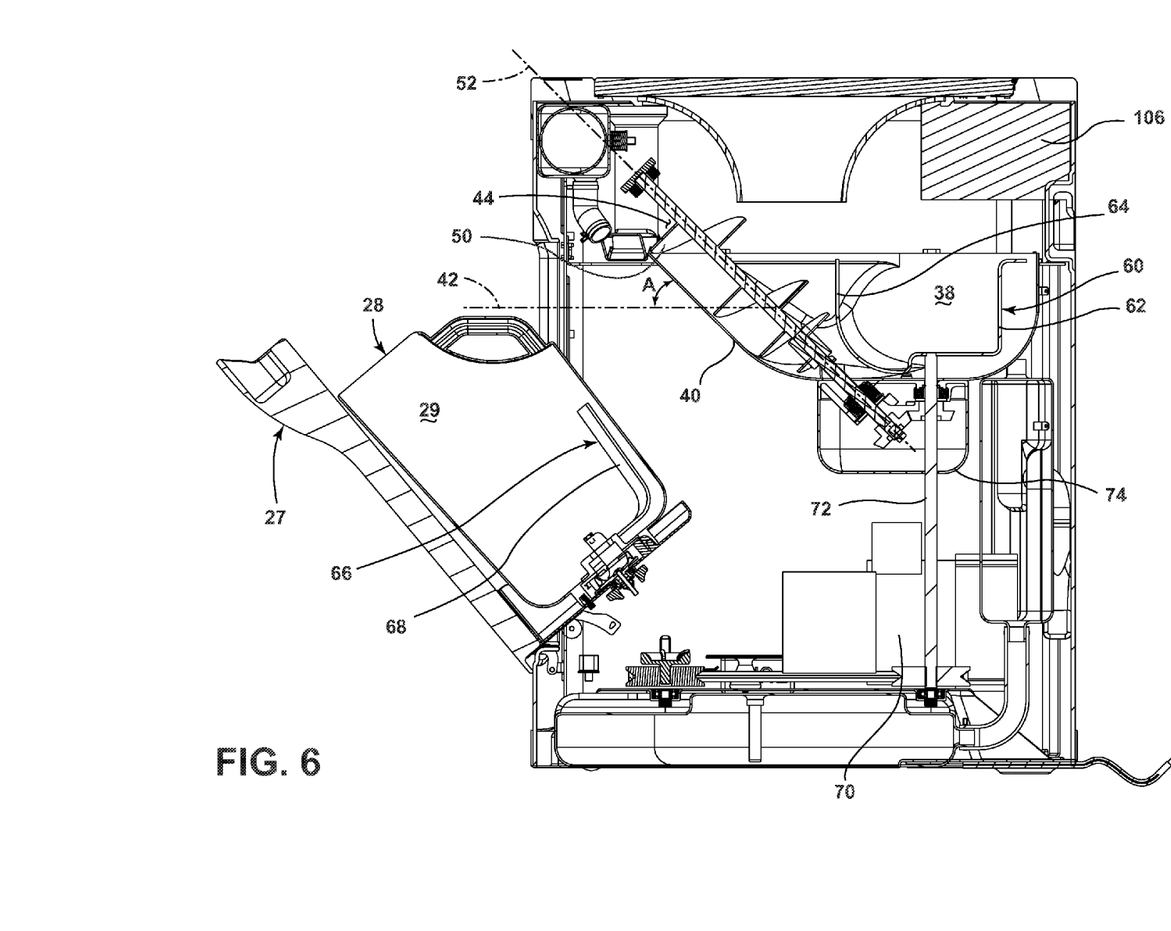
FIG. 6 is a cross sectional side view of the composting device of FIG. 1, wherein the access door is in the open position.

While the motor 70 may be directly coupled to the first reducing mechanism 60 in one embodiment, as illustrated in FIG. 6, a gear box 74 may be positioned vertically above the motor 70 for coupling the motor 70 and the first reducing mechanism 60. The gear box 74 may include a plurality of gears or racks and pinions for controlling the operating speed of the first reducing mechanism 60. The gear box 74 may also be coupled to the rotatable auger 50 for providing a rotational movement of the rotatable auger 50. Therefore, the first reducing mechanism 60 and the rotatable auger 50 may rotate concurrently.

In another embodiment, the operation of the first reducing mechanism 60 and the rotatable auger 50 may be separately controlled. The operation of the first reducing mechanism 60 and the rotatable auger 50 may be separately controlled by providing each of them with a separate motor. For example, a motor may be provided to each of the first reducing mechanism 60 and the rotatable auger 50 such that the rotational speed and/or rotational direction may be controlled independently from each other.

An air supply system may be provided to the composting device 10 for providing air flow into/out of the hopper 30 and/or the container 28. The air supply system may include a fan compartment 80 for supplying, drawing, and filtering air into and out of the hopper 30, and the fan compartment 80 may include a vacuum pump, a fan, and filter material. The fan in the fan compartment 80 may be fluidly coupled to a pre filter 78, which, in turn, is fluidly coupled to the hopper 30 via an air inlet tube 76 for supplying the air into the hopper 30. The pre filter 78 may typically be positioned at the upper portion of the cabinet 12, and may filter any unwanted dust from the air inlet.

The fan compartment 80 may be fluidly coupled to the outlet 44 of the hopper conduit 40. For example, the vacuum pump of the fan compartment 80 may be positioned adjacent to the outlet 44 for controllably drawing air with odors and/or microbes from the hopper 30 by operating the vacuum pump. Filter material, such as charcoal, positioned in the fan compartment 80 may filter odors and/or microbes from the air drawn from the hopper 30. It will be understood that the fan may also be fluidly coupled to the container 28 via an air supply inlet 81 for supplying filtered air downwardly into the container 28.

An air outlet tube 82 may fluidly extend from a portion of the container 28 for drawing the air from the container 28 to eliminate odors and/or microbes generated in the container 28 before the air is exhausted out of the composting device 10. The air outlet tube 82 may be coupled to an air filter 84, which may include a filter material. Filter material may include among other things charcoal, previously composted material and/or a biofilter material. While not shown, the operation of the air filter 84 may be controlled by the fan compartment 80.

A water supply system may be provided to the composting device 10 for providing moisture to the interior of the hopper 30 and/or the container 28. The water supply system may include a water fill conduit 86, which may be fluidly coupled to the water fill inlet 25 on the portion 23 of the top wall 20, for receiving water from outside of the composting device 10 into a water reservoir in the cabinet 12. At least one water reservoir may be provided for storing water received via the water fill conduit 86. As illustrated, a primary water reservoir 88 and an auxiliary water reservoir 90 are provided to the lower portion of the cabinet 12 and the back wall 16, respectively. It may be understood that the height of the auxiliary water reservoir 90 is configured to be higher than that of the primary water reservoir 88. The water fill conduit 78 may be fluidly coupled to the auxiliary water reservoir 90, which, in turn, may be fluidly coupled to the primary water reservoir 88 such that the water may be first received by gravity in the primary water reservoir 88 via a water conduit 92.

The water supply system may also include a water pump 94 for controllably providing water from the primary water reservoir 88 to the interior of the hopper 30 via a water inlet tube 96. As illustrated, the water pump 90 may be positioned adjacent to the primary water reservoir 88. An end portion of the water inlet tube 92 may be received in the upper portion of the conduit 40 of the hopper 30.

The composting device 10 may include one or more sensors 100 provided in one or more of the components of the composting device 10 to receive input from the sensors, which are known in the art and not shown for simplicity. Non-limiting examples of sensors 100 include: temperature sensors, humidity sensors (or moisture sensors), level sensors, odor sensors, pH sensors, water level sensor, temperature sensor, and weight sensors. For example, a humidity sensor may be provided to the interior of the hopper 30 and the container 28 respectively for determining the amount of humidity in the hopper 30 and the container 28. In another example, a level sensor may be provided to at least one of the hopper 30 or the container 28 to determine the amount of refuse or material the hopper 30 or the container 28. At least one water level sensor may be provided to at least one of the primary water reservoir 88 or auxiliary water reservoir 90 to determine the liquid level received in the water reservoir. A temperature sensor may be operably coupled to the interior of the hopper 30 for determining the temperature of refuse.

Figure 7:
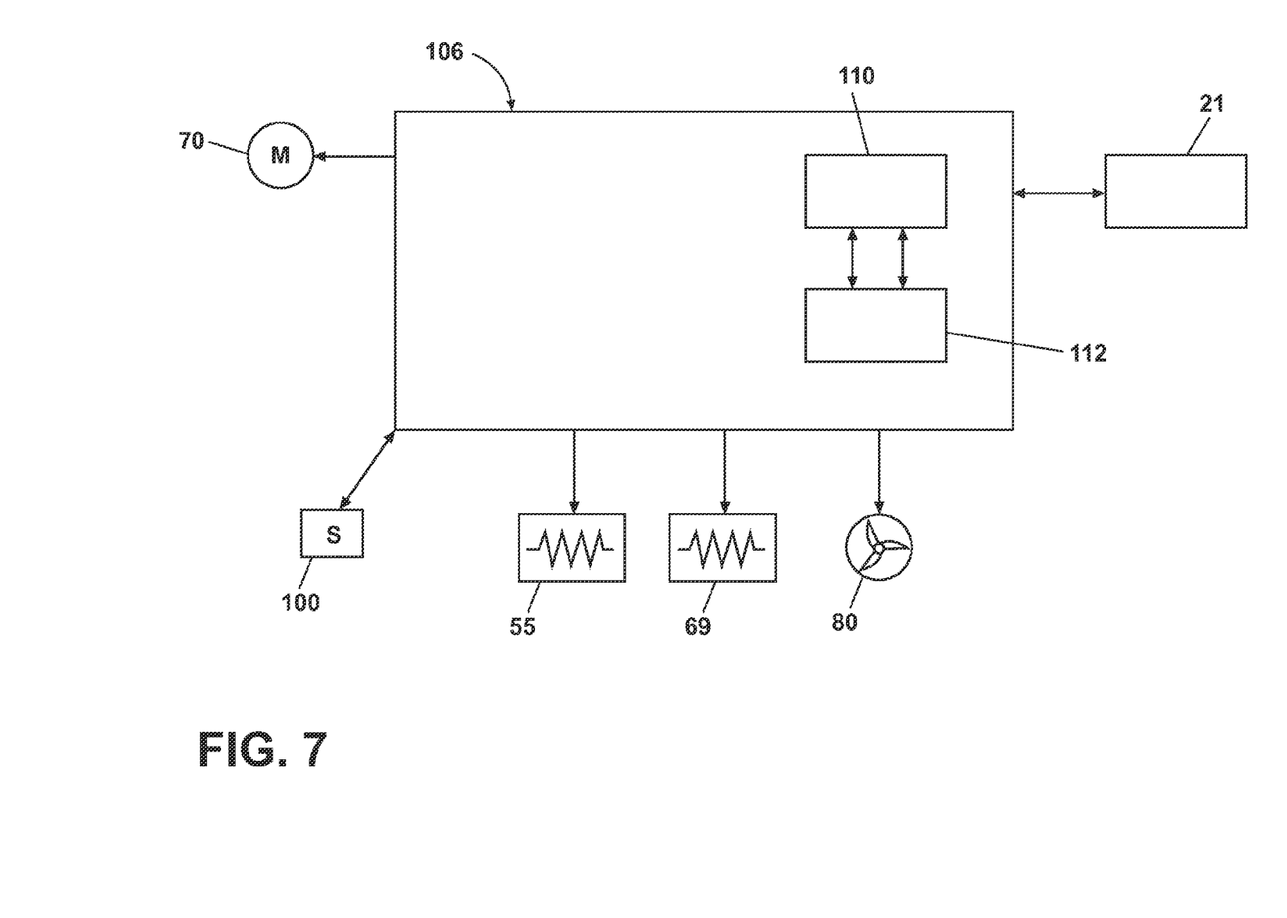
FIG. 7 is a schematic of a controller of the composting device of FIG. 1.

Referring now to FIG. 7, a schematic of the controller 106 for controlling the operation of the composting device 10 is illustrated. The controller 106 may be provided with a memory 110 and a central processing unit (CPU) 112. The memory 110 may be used for storing the control software that is executed by the CPU 112 in completing a cycle of operation using the composting device 10 and any additional software. The memory 110 may also be used to store information, such as a database or table, and to store data received from one or more components of the composting device 10 that may be communicably coupled with the controller 106.

The controller 106 may be operably coupled with one or more components of the compositing device 10 for communicating with and controlling the operation of the component to complete a cycle of operation. For example, the controller 106 may be operably coupled with the motor 70 to control the operation of the motor 70. In another example, the controller 106 may be operably coupled to the fan compartment 80 for selectively operating the vacuum pump and fan received in the fan compartment 80.

In yet another example, the controller 106 may also be operably coupled with the first and second heating elements 55, 69 for controllably providing heat energy to the heating elements 55, 69 according to a cycle of operation, for keeping the temperature and/or humidity in the hopper 30 and container 28 within a predetermined range.

The controller 106 may also be coupled with one or more sensors 100 provided in one or more of the systems of the composting device 10 to receive input from the sensors, which are known in the art and not shown for simplicity. Non-limiting examples of sensors 100 that may be communicably coupled with the controller 106 include: temperature sensor, humidity sensor, level sensor, odor sensor, pH sensor, water level sensor, temperature sensor, and weight sensor, which may be used to determine a variety of system characteristics, such as the amount of moisture in the refuse, the amount and/or temperature of the refuse in the hopper 30, or the water level in the primary or auxiliary water reservoir 88, 90.

In operation, refuse, such as organic food waste or leaves, may be provided by the user to the interior of the hopper 30 through the opening 24 of the top wall 20. The refuse may be supplied to the interior of the hopper 30 over a period of time until the volume or weight of the refuse satisfies a predetermined threshold, as determined by the level sensor or weight sensor. In one embodiment the period of time may be 30 days. The composting cycle may begin when the level of refuse reaches a predetermined level or it may begin as soon as refuse is placed in the hopper and run continuously. In another embodiment, the composting cycle may initiate as long as the level sensor or weight sensor determines that the refuse is received in the hopper 30.

The refuse may be uniformly mixed and decimated by rotating the reducing mechanism positioned at the lower portion of the hopper 30 at a predetermined speed according to the cycle of operation. Grinding may occur periodically. The refuse may also be provided with heat, water and/or aeration according to the cycle of operation to promote the decomposition of the refuse. During the composting process, worms, bacteria and fungi may further break up the refuse in a chemical process that converts the refuse into heat, carbon dioxide or ammonium, which may be beneficial as a fertilizer to the soil. The humidity level in the hopper 30 may be monitored by the humidity sensor such that the humidity may not decline below a predetermined level. In one example, the relative humidity in the interior of the hopper 30 and the container 28 may not go down below about 25% for preventing the refuse from being too dry.

During the composting process, first heating element 55 may be controllably operated to maintain the temperature in the hopper 30 within a predetermined temperature range. The predetermined temperature range may vary with the progress of composting process, and the temperature may be determined by the temperature sensor. By keeping the temperature within a predetermined range, the number of microbes undesirable to the composting process may be reduced. Further, the relative humidity level in the hopper 30 may also be controlled by controllably operating the first heating element 55 to enhance the overall rate of composting process. For example, the controlled operation of heating element 55 may be advantageous in reducing excessive humidity from wet organic food waste.

While the composting process proceeds in the hopper 30, the material in the hopper accumulates and may reach a predetermined level in approximately one month, whereupon the partially composted refuse is transferred from the hopper 30 to the container 28. Importantly, the container 28 is disposed beneath the outlet 44 when it is in the closed position. For transferring the refuse, the rotatable auger 50 may rotate about its rotational axis 52 to capture the refuse and move it upwardly to the open end portion of the conduit 40. The refuse may be moved downwardly by gravity to the container 28 through the downspout 54. Enzymes may be provided to the hopper 30 or the container 28 or both by the enzyme dispenser 56 for continuing and enhancing the composting process. The refuse may be further decomposed by controlling the amount of water and aeration in the refuse in the container 28.

It may be understood that the second heating element 69 may operate to keep the temperature and/or humidity of refuse within a predetermined level according to a cycle of operation. The composting process in the container 28 may take approximately one month before the composting process is complete and compost is available for use from the container 28.

Figure 8:
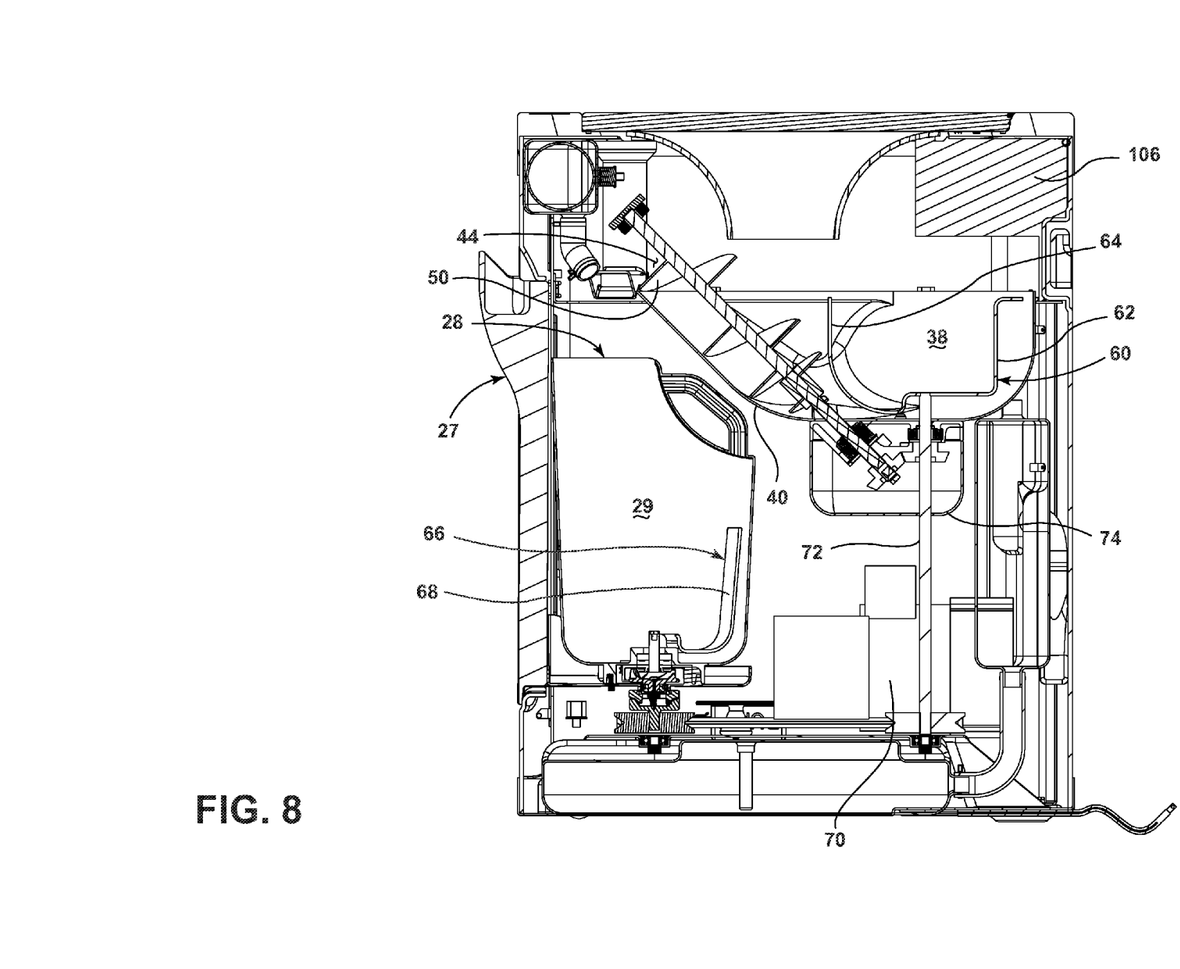
FIG. 8 is a cross sectional side view of the composting device of FIG. 1, wherein an access door is in the closed position.

FIG. 8 is a cross sectional side view of the composting device 10 of FIG. 1, wherein the access door 27 is in the closed position. As illustrated, the container 28 may be coupled to the internal side of the access door 27, and may be positioned beneath the conduit 40 such that the container 28 and the end portion of conduit 40 are vertically aligned with each other. The shape of the container 28 may be such that the container 28 will not interfere with the conduit 40 extending upwardly with a predetermined angle relative to a horizontal axis. As a result, the container 28 may be positioned at least partially below the hopper 30. Furthermore, location of the container 28 may be adjusted to be adjacent to the motor 70 to further reduce the footprint of the composting device 10.

Figure 9:
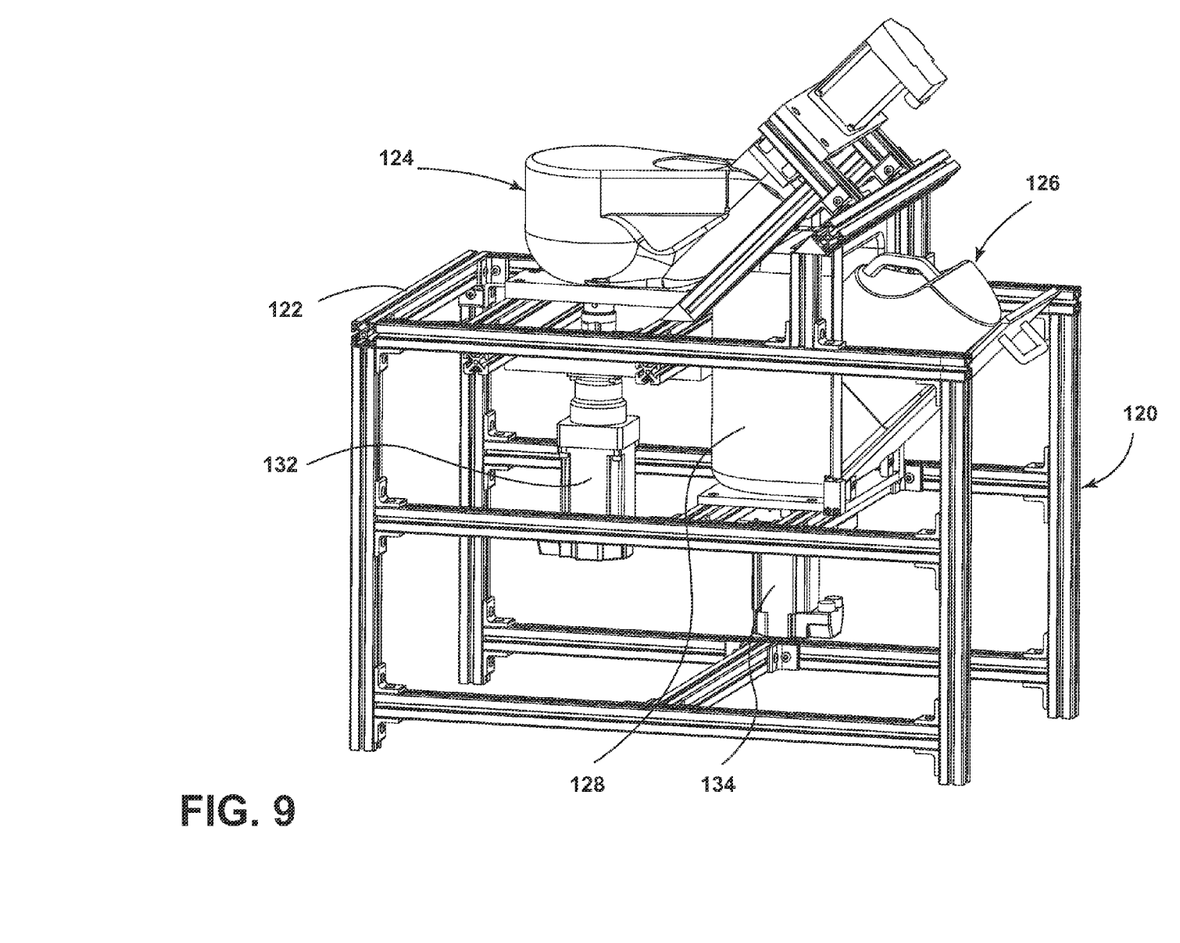
FIG. 9 is a perspective view of the composting device according to a second embodiment of the invention, where both an auger and a reducing system are provided with or for operating independently from each other.

FIG. 9 is a perspective view of the composting device according to a second embodiment of the invention, where each of the auger and the reducing mechanisms for the hopper and the container is provided with a motor for independent operation. The composting device illustrated in FIG. 9 may otherwise be similar to the composting device 10 described above in having a hopper 124, a container 126 for transforming the refuse into compost by decomposing the refuse received in the hopper 124, and transferring the refuse into the container 126 for additional composting.

The primary difference between the first embodiment of the composting device 10 described above and the device in FIG. 9 may be the number of motors. As illustrated in FIG. 9, the hopper 124 and the container 126 are provided with motors 132, 134 which are dedicated for the operation of the hopper 124 and the container 126, respectively. The hopper 124 may be operably coupled to a motor 132, and the container 126 may be coupled to a motor 134. By providing a separate motor to the hopper 124 and the container 126, compost may be prepared in a controlled way and unnecessary power consumption may be avoided. For example, if the refuse is not provided into the hopper 30 due to an extended absence of the user, only the motor coupled to the container 28 is needed to operate to complete the transformation of the refuse into compost.

The composting device in FIG. 9 may also include a container holder 128 for holding the container 126. The composting device may be mounted to a stand 120 comprising a plurality of frame members 122 while the stand 120 may not be required in another embodiment. Any composting device having two motors may also be housed in a cabinet.

The invention described herein provides a compact composting device by positioning the container at least underneath the hopper, and upwardly extending the conduit having the rotatable auger such that the container and the end portion of the conduit are vertically aligned to each other. Additionally, the combination of two separate chambers, hopper and the container, makes the overall composting process faster and more efficient by sequentially transforming the refuse into compost in two separate chambers. The composting device in the claimed invention may be advantageous in that smaller and efficient composting device may be located in the household for hygienically transforming the organic food waste into compost.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure. The primary differences between the exemplary embodiments relate to the cabinet, the frame, the existence and location of the access door, the accessibility of the container, the mounting of the container, the location and number of reducing mechanisms, the heater, the location and number of motors, and these features may be combined in any suitable manner to modify the above embodiments and create new embodiments. As examples, the first and second reducing mechanisms may be linked to a single motor, and the auger linked to a different motor. The first reducing mechanism and the auger may be linked to a single motor, and the second reducing mechanism to a different motor. Any combination of motors and reducing mechanism may be in a cabinet or a frame. Any of the foregoing combinations may have a container mounted to the access door or mounted separately in the cabinet.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A device for transforming refuse into compost, the device comprising:
    a cabinet;
    a hopper at an upper portion of the cabinet and having an opening through the cabinet configured to receive refuse;
    a first reducing mechanism in the hopper operable to reduce particle size of the refuse and mix the refuse with at least one of air, water, or enzymes;
    a transfer mechanism disposed in a conduit extending upwardly from the hopper to an outlet in the upper portion of the cabinet;
    a motor beneath the hopper and the transfer mechanism and operably connected to the first reducing mechanism and the transfer mechanism to operate the first reducing mechanism and the transfer mechanism;
    a first heater coupled to the hopper;
    a container removably mounted within the cabinet adjacent the motor and beneath the outlet to receive ground refuse from the outlet, wherein the container is accessible from outside the cabinet;
    a water supply coupled to at least one of the hopper, the conduit, the outlet, or the container to dispense water into the refuse;
    an enzyme dispenser coupled to at least one of the hopper, the conduit, the outlet, or the container to dispense enzymes into the refuse; and
    a controller operably connected to the first reducing mechanism, the transfer mechanism, the water supply, the first heater, and the enzyme dispenser to maintain the temperature and moisture of the refuse within a predetermined range to convert the refuse into compost in the container.

2. The device of claim 1 wherein the transfer mechanism extends to a point above the container.

3. The device of claim 1 wherein the container is located at least partially below the hopper.

4. The device of claim 1 wherein the container is located at least partially above the motor.

5. The device of claim 1, further comprising an access door movably connected to a side of the cabinet between open and closed positions, wherein the container is removably mounted to the access door and located adjacent the motor and beneath the outlet when the access door is in the closed position.

6. The device of claim 5 wherein the access door is pivotally connected to the cabinet.

7. The device of claim 6 wherein the pivotal connection is on a horizontal axis.

8. The device of claim 5 wherein the access door is slidable between the open position and the closed position.

9. The device of claim 5 wherein the first reducing mechanism comprises at least one of a grinding wheel or a grinding blade.

10. The device of claim 5 wherein the cabinet is configured to be positioned under a countertop.

11. The device of claim 5 wherein the container comprises a second reducing mechanism operably connected to the container.

12. The device of claim 11 wherein the second reducing mechanism is operably coupled to the first reducing mechanism in the hopper.

13. The device of claim 11 wherein each of the first and second reducing mechanisms and an auger in the transfer mechanism is driven by the motor.

14. The device of claim 1 wherein the first reducing mechanism comprises at least one of a grinding wheel or a grinding blade.

15. The device of claim 1 wherein the cabinet is configured to be positioned under a countertop.

16. The device of claim 1 wherein the container comprises a second reducing mechanism operably connected to the container.

17. The device of claim 16 wherein the second reducing mechanism is operably coupled to the first reducing mechanism in the hopper.

18. The device of claim 16 wherein each of the second reducing mechanisms and the transfer mechanism is driven by the motor.

19. The device of claim 1 further compromising a second heater coupled to the container.

20. The device of claim 1 further comprising an air supply system for providing air flow through one of the hopper or the container.

* * * * *